Jan. 2, 1962 D. W. SMITH 3,015,505
PACKING GLAND FOR VERTICAL SCREW CONVEYOR
Filed Jan. 12, 1959
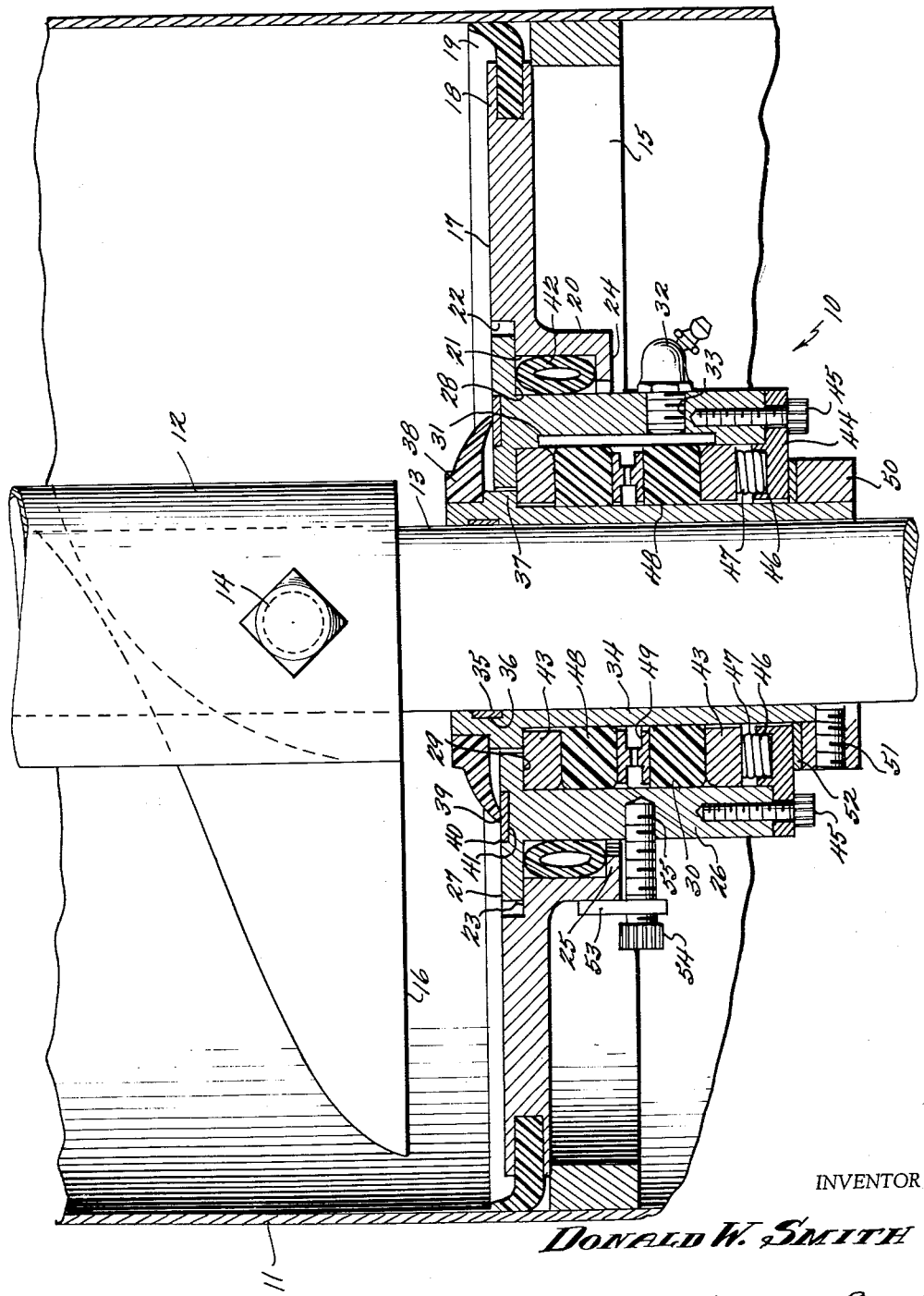
INVENTOR
DONALD W. SMITH
BY
Kimmel & Crowell
ATTORNEYS 3,015,505
Patented Jan. 2, 1962

3,015,505
PACKING GLAND FOR VERTICAL SCREW CONVEYOR
Donald W. Smith, Oklahoma City, Okla., assignor to Southwestern Cotton Oil Company, Oklahoma City, Okla.
Filed Jan. 12, 1959, Ser. No. 786,205
3 Claims. (Cl. 286—11.13)

The present invention relates to a packing gland for a vertical screw conveyor to prevent leakage from the lower end thereof.

The primary object of the invention is to provide a packing gland for a vertical screw conveyor which will permit eccentric movement of the conveyor shaft without affecting the seal of the gland.

Another object of the invention is to provide a packing gland of the class described above in which the gland is lubricated and provided with means for eliminating wear of the conveyor shaft.

A further object of the invention is to provide a packing gland of the class described above, which will prevent leakage of bulk materials from any housing, bin, or vessel through which a rotating shaft must pass in order to convey, elevate or mix the bulk materials. In fulfilling the above requirement, the gland will operate with its axis arranged horizontally, vertically or inclined.

Another object of the invention is to provide a packing gland which is liquid tight as some of the materials being conveyed will have a high liquid content, such as paper pulp.

A further object of the invention is to provide a packing gland of the class described above wherein means are provided to prevent radial movement of the shaft with respect to the non-rotating packing members during the operation of the conveyor.

A still further object of the invention is to provide a packing gland of the class described above which is inexpensive to manufacture, simple to use and which effectively seals the lower end of a vertical screw conveyor while preventing contamination of material within the conveyor.

Other objects and advantages will become apparent in the following specification when considered in light of the attached drawings, in which:

The drawing illustrates a vertical sectional view through the packing gland with the screw conveyor and shaft shown in fragmentary side elevation.

Referring now to the drawing in detail wherein like reference characters indicate like parts throughout the figure, the reference numeral 10 indicates generally a vertical screw conveyor which includes an upright cylindrical housing 11 having an elongated vertical screw 12 positioned therein and secured to an elongated shaft 13 by means of a bolt 14.

A ring 15 is fixedly secured in the housing 11 below the lower end 16 of the conveyor screw 12. A generally flat circular disc 17 is supported on the ring 15 and is provided with a generally rectangular annular groove 18 formed in the peripheral edge thereof. A neoprene gasket ring 19 is seated in the rectangular groove 18 and extends radially outwardly therefrom into sealing contact with the inner wall of the housing 11.

The disc 17 is provided with a depending annular boss 20 having an axial bore 21 formed therein. An annular recess 22 extends radially outwardly from the upper end of the axial bore 21 to form a horizontal shoulder 23. A flange 24 extends radially inwardly from the lower end of the boss 20, forming a horizontal shoulder 25 at the lower end of the bore 21.

A generally cylindrical stuffing box 26 has an annular ring 27 integrally formed on its upper end projecting radially outwardly to form a horizontal shoulder 28 and projecting radially inwardly to form a horizontal shoulder 29. The stuffing box 26 has an axial bore 30 extending therethrough and has a longitudinally extending grease passage 31 formed therein adjacent one side thereof. A grease fitting 32 is mounted in a threaded bore 33 in the stuffing box 26 communicating with the longitudinal grease passage 31.

An elongated chrome steel wear sleeve 34 is fitted snugly to the shaft 13 and is sealed thereto by a felt seal 35 positioned in an internal annular groove 36 formed in the upper end of the sleeve 34. An annular flange 37 is integrally formed on the sleeve 34 adjacent the upper end thereof and extending radially outwardly therefrom.

An annular neoprene excluder gasket 38 is mounted on the sleeve 34 in engagement with the upper end of the flange 37 and slopes outwardly and downwardly therefrom to the peripheral edge 39 thereof. An annular Teflon wear ring 40 is seated in an annular groove 41 formed in the annular ring 27 at the upper end thereof. The excluder gasket 38 has the peripheral edge 39 thereof in engagement with the Teflon wear ring 40.

An annular neoprene hose member 42 is engaged between the outer surface of the stuffing box 26 and the bore 21 of the boss 20. The member 42 engages the shoulder 25 of the flange 24 and the shoulder 28 of the annular ring 27 to completely seal the stuffing box 26 to the boss 20. The shoulder 28 of the annular ring 27 outwardly of the member 42 is supported on the shoulder 23 within the recess 22. An annular brass packing retainer ring 43 is arranged between the sleeve 34 and the bore 30 of the stuffing box 26, in contact with the lower edge of the flange 37 and the shoulder 29 of the annular ring 27. The packing retainer 43 is spaced slightly outwardly of the sleeve 34 to permit the sleeve 34 to be centered in the stuffing box 26. A second annular brass packing retainer 43 is arranged in parallel relation to the first packing retainer 43 spaced substantially therebelow.

An annular cap 44 is releasably secured to the lower end of the stuffing box 26 by means of a plurality of bolts 45. The cap 44 projects slightly into the bore 30 and has a plurality of socket recesses 46 formed therein as seats for a plurality of coil springs 47 which engage the lower packing retainer 43, biasing it toward the upper packing retainer 43.

A pair of vertically spaced Teflon packing rings 48 are arranged in engagement with the packing retainers 43 and are maintained in spaced condition by a perforate steel grease ring 49 interposed therebetween.

An annular set collar 50 is secured to the lower end of the sleeve 34 by means of a set screw 51. The set screw 51 engages the shaft 13 to lock the sleeve 34 thereto. A brass washer 52 is interposed between the set collar 50 and the cap 44 to provide a bearing surface. A bracket ear 53 is secured to the cylindrical boss 20 in depending relation thereto and has a cap screw 54 slidably engaged therethrough. The cap screw 54 is threaded into a threaded bore 55 in the stuffing box 26 to maintain the stuffing box 26 against rotation with respect to the disc 17.

In the use and operation of the invention, grease is fed through the grease fitting 32 into the space between the stuffing box 26 and the sleeve 34, completely surrounding the packing rings 48, packing retainers 43 and grease ring 49. The grease is distributed through the longitudinally extending recess 31. The shaft 13 is then rotated, carrying with it the sleeve 34, felt packing 35, excluder gasket 38, set collar 50, washer 52, and set screw 51. The packing rings 48 engage the outer surface of the sleeve 34 and the bore 30 of the stuffing box 26 to prevent leakage therebetween. The excluder gasket 38 engages the wear ring 40 to prevent material from the conveyor 10 from passing between the stuffing box 26 and the wear sleeve 34.

As can be easily seen from the drawings, the stuffing box 26 loosely engages in the disc 17 and is maintained in central position therein by the neoprene hose seal 42 positioned therebetween. Should the shaft 13 wobble, whip or move in an eccentric path, the stuffing box 26 will move with respect to the disc 17 to the extent permitted by the hose seal 42 and the recess 22. Relative rotation between the stuffing box 26 and disc 17 is prevented by the cap screw 54 and ear 53. The brass bearing retainer rings 43 engage between the bore 39 of the stuffing box 26 and the outside diameter of the wear sleeve 34 so that lateral movement of the sleeve 34 with respect to the stuffing box 26 in a direction to compress the packing rings 48 is effectively prevented.

Having thus described the preferred embodiments of the invention, it should be understood that numerous structural modifications and adaptations may be resorted to without departing from the scope of the appended claims.

What is claimed is:

1. A packing gland for vertical screw conveyors of the type including a cylindrical housing and a rotatable shaft axially mounted in said housing comprising a disc, means sealing said disc peripherally to said housing, said disc including a depending annular boss, a stuffing box sealingly mounted in said annular boss for flexible radial movement therein, a sleeve fixed to said shaft for rotation therewith and extending through said stuffing box, first seal means fixed to said sleeve in sealing engagement with said stuffing box to prevent entrance of material thereto, and second seal means sealing said sleeve and said stuffing box to prevent passage of material therebetween.

2. A packing gland as defined in claim 1 wherein said first seal means comprises an annular excluder gasket rigidly secured to the upper end of said sleeve and in engagement with a wear plate on the upper end of said stuffing box.

3. A packing gland as defined in claim 1 which further includes an annular cap releasably secured to the lower end of said stuffing box, resilient means engaging said cap and said second seal means to bias the same in a longitudinal direction to increase the sealing contact thereof with said sleeve and said stuffing box.

References Cited in the file of this patent

UNITED STATES PATENTS

| | | |
|---|---|---|
| 988,730 | Mosley | Apr. 4, 1911 |
| 2,418,707 | Groot | Apr. 8, 1947 |
| 2,478,649 | Wightman | Aug. 9, 1949 |
| 2,567,527 | Parks | Sept. 11, 1951 |
| 2,742,306 | Kelso | Apr. 17, 1956 |
| 2,863,680 | Taltavall | Dec. 9, 1958 |